United States Patent [19]
Iwai et al.

[11] Patent Number: 5,387,335
[45] Date of Patent: Feb. 7, 1995

[54] FILTER CIRCULATING TYPE SEWAGE DISPOSAL APPARATUS

[76] Inventors: Isamu Iwai, 12-14, Shimosueyoshi 1-chome, Tsurumi-ku, Yokohama-shi, Kanagawa-ken; Chikatsu Nirasawa, 13-7, Bunka 1-chome, Sumida-ku, Tokyo, both of Japan

[21] Appl. No.: 50,362

[22] PCT Filed: Nov. 21, 1990

[86] PCT No.: PCT/JP90/01514
§ 371 Date: May 14, 1993
§ 102(e) Date: May 14, 1993

[87] PCT Pub. No.: WO92/09533
PCT Pub. Date: Nov. 6, 1992

[51] Int. Cl.⁶ ............................................ C02F 3/08
[52] U.S. Cl. .................................. 210/151; 210/194; 210/219
[58] Field of Search ............ 210/615, 616, 621, 150, 210/151, 195.1, 194, 196, 197, 205, 219, 220, 265

[56] References Cited

U.S. PATENT DOCUMENTS

| | | | |
|---|---|---|---|
| 2,071,591 | 2/1937 | Tholin | 210/616 |
| 4,055,490 | 10/1977 | Hasegawa et al. | 210/616 |
| 4,500,429 | 2/1985 | Reimann et al. | 210/616 |
| 4,863,606 | 9/1989 | Ryall | 210/616 |
| 5,030,353 | 7/1991 | Stuth | 210/615 |
| 5,198,105 | 3/1993 | Kauling et al. | 210/151 |

FOREIGN PATENT DOCUMENTS

| | | | |
|---|---|---|---|
| 60-183096 | 9/1985 | Japan | C02F 3/30 |
| 61-2440 | 1/1986 | Japan | C02F 3/10 |
| 62-79896 | 4/1987 | Japan | C02F 3/08 |
| 63-54995 | 3/1988 | Japan | C02F 3/08 |

*Primary Examiner*—Thomas Wyse
*Attorney, Agent, or Firm*—Marks & Murase; Michael D. Bednarek

[57] ABSTRACT

The present invention relates to a sewage disposal apparatus employing large buoyant filter media and is directed to prevent effectively clogging in these filter media. The intended object of the invention can be attained by circulating the filter media by a circulation arrangement to allow the filter bed as a whole to flow very calmly, and more efficiently by removing sludge deposited on the filter media utilizing the circulatory movement of the filter media.

15 Claims, 8 Drawing Sheets

FILTER CIRCULATING TYPE SEWAGE DISPOSAL APPARATUS

TECHNICAL FIELD

The present invention relates to improvements in a sewage disposal apparatus employing a buoyant filter system, particularly large buoyant filter media having a diameter of several to ten centimeters or so, which apparatus is suitably employed for purifying a large capacity of water, for example for purifying river water.

BACKGROUND ART

The sewage disposal apparatus employing large filter media has a filter bed formed by an assembly of a multiplicity of buoyant filter media in a septic tank, with aerobic or anaerobic bacteria which are effective for sewage treatment being allowed to proliferate on this filter bed, and sewage is designed to be purified gradually as it is allowed to flow slowly downstream in the septic tank in contact with the filter media in the filter bed.

However, in the prior art sewage disposal apparatus employing large filter media, the filter bed is fixed, so that sludge clogging occurs in each medium or between the media to reduce purifying capacity of the apparatus after a predetermined amount of treatment. In order to eliminate such reduction in the purifying capacity, the filter media in the apparatus must entirely be replaced with new ones or cleaned and the apparatus must be overhauled periodically, leading to great operation cost elevation.

There are other conventional methods which prevent such clogging by employing filter media hard to be clogged or by pretreating sewage to reduce the sludge concentration thereof, followed by treatment of the diluted sewage for final sewage disposal treatment.

However, the conventional method employing pretreatment of sewage requires considerably troublesome work for the pretreatment itself, and all what it can do is to delay clogging. Thus, it is impossible to thoroughly obviate clogging itself, and eventually, the filter media must be replaced with new ones or cleaned periodically, which requires troublesome, heavy work.

Meanwhile, a buoyant, spherical filter medium hard to agglomerate itself with others is disclosed, for example, in Japanese Patent No. 1343032 (Japanese Patent Publication (Kokoku) No. 61-2440). Such contrivance may impart a high level of clogging inhibitory capacity to the medium itself, but it is not sufficient to completely eliminate clogging.

The present invention has been made in view of such problems in the prior art, and it is therefore an object of the invention to provide a sewage disposal apparatus, in which a gentle flow of the filter bed is provided by a circulatory movement of the filter media, while the sewage under purification treatment flowing through the filter bed is adapted not to be affected, or the flakes of sludge coming off from the filter media are prevented from diffusing into the treated water as the filter media are moved, and further the filter media are cleaned by utilizing this circulatory movement thereof whereby to prevent effectively the clogging of the filter medium as well as to constantly enable efficient sewage disposal treatment.

DISCLOSURE OF THE INVENTION

The objects of the invention can be attained by a circulating filter type sewage disposal apparatus having a septic tank containing many buoyant filter media to form a filter bed consisting of an assembly of these filter media, in which sewage is purified by the action of bacteria proliferating on the filter bed as the sewage is allowed to flow downstream in contact with the filter bed in the septic tank, said apparatus comprising:

a filter moving means for returning the filter media to the upstream extremity from the downstream extremity of the septic tank; and a first current forming means for generating a vortex current and a second current forming means for generating a straight jet stream current, at the upstream extremity of the septic tank;

wherein the filter media separated from the filter bed at the downstream extremity of the septic tank are brought back to the upstream extremity of the septic tank by the filter moving means, while the filter media brought back to the upstream extremity are returned to the bottom layer of the filter bed with the aid of the vortex current formed by the first current forming means and the straight jet stream current formed by the second current forming means.

The sewage disposal apparatus of the invention is developed based on the finding that clogging can effectively be prevented so long as the filter media are constantly in motion, but if the filter media are moved disorderly, it allows diffusion of the sludge flakes coming off from the filter media throughout the septic tank.

Accordingly, the sewage disposal apparatus of the invention can effectively prevent clogging in the filter media and constantly enables efficient purification of sewage by securing constant and orderly movement of the filter media which proved to be a prerequisite according to the above finding.

In other words, the cycle of separating the filter media reached the downstream extremity of the apparatus and returning them to the filter bed at the upstream extremity is repeated continuously to allow the filter bed to flow calmly as if it were a glacier as the filter media are circulated, and thus clogging of the filter media can effectively be prevented. Meanwhile, since the filter media are adapted to be rotated being involved in the vortex current formed by the first current forming means when the filter media are returned to the filter bed at the upstream extremity, cleaning of the filter media can also be carried out effectively by this rotational movement. Besides, the filter media are allowed to perform such movement as to allow coming off of the sludge deposited thereon substantially only at the upstream extremity of the septic tank, or at the portion of the untreated sewage where the sludge may not give adverse effect to the sewage treatment, causing no reduction in the purification efficiency attributable to diffusion of such sludge flakes.

Use of a water current as the filter moving means enables more rational designing of the apparatus. More specifically, if a circulation passage is provided in the septic tank to cause a water current, communicating to the inside of the septic tank, to flow from the downstream extremity to the upstream extremity of the septic tank and to allow the filter media to flow on the water current in this circulation passage, separation of the filter media from the filter bed can be carried out more effectively and efficiently, and also possible causes of troubles can be reduced in the filter moving means.

When the filter media are allowed to move using the water current in the circulation passage, a sludge removing means may be disposed for removing sludge from the filter media in this passage. Such arrangement can further minimize contamination of the treated water with the sludge flakes coming off from the filter media, and thus purification efficiency can further be enhanced.

As the sludge removing means in the circulation passage, a vortex current formed therein can be employed. Such means is of a very simple structure and high efficiency.

The septic tank may be of a shuttle type structure where the upstream extremity and the downstream extremity are located side by side. Such shuttle type structure can improve utilization of the installation space in the case of an elongated septic tank.

A conveyor having a drive source may also be used as other filter moving means than the water current.

BEST MODE FOR CARRYING OUT THE INVENTION

Preferred embodiments of the present invention will be described below with reference to the attached drawings.

It should be appreciated that like or corresponding parts are represented by the same reference numbers, and duplicate description thereof will be omitted.

While the following embodiments are all described referring to aerobic type, the present invention is not limited thereto, but may be applied to those of anaerobic type.

First Embodiment

Figure 1:
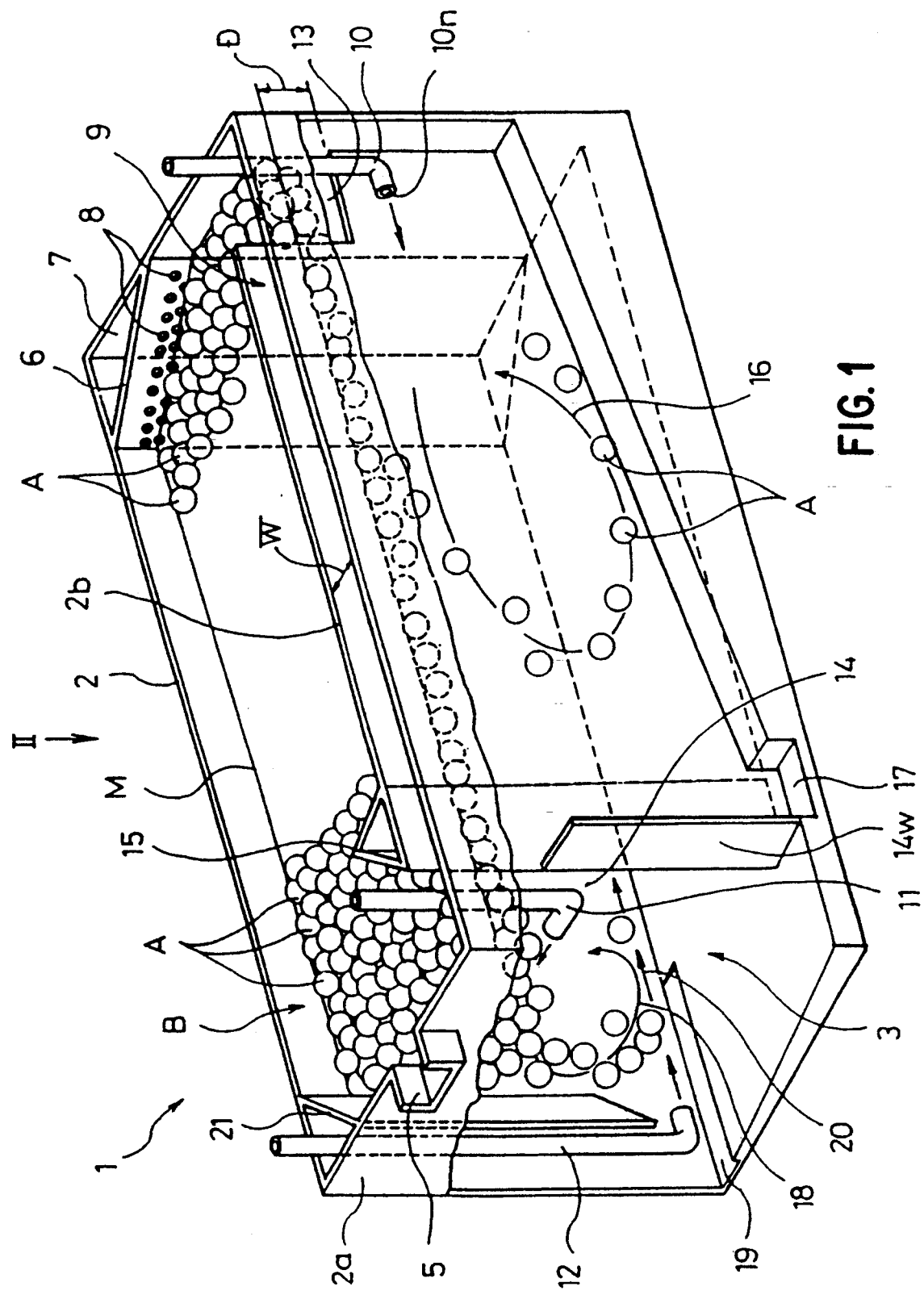
FIG. 1 is a partially cut-away schematic perspective view of the circulating filter type sewage disposal apparatus according to a first embodiment of the invention.
Figure 2:
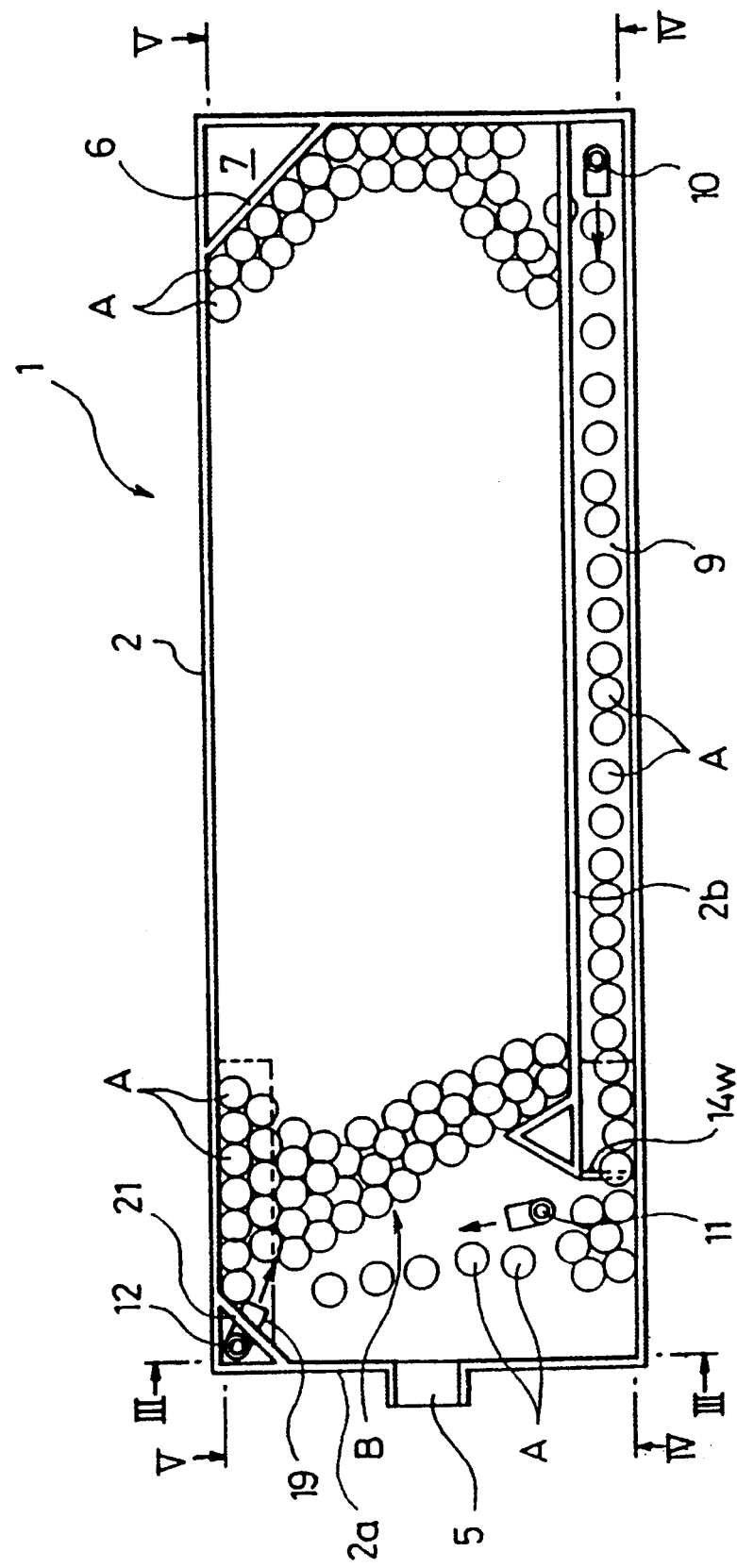
FIG. 2 is a schematic plan view of the apparatus from the view II of FIG. 1.
Figure 3:
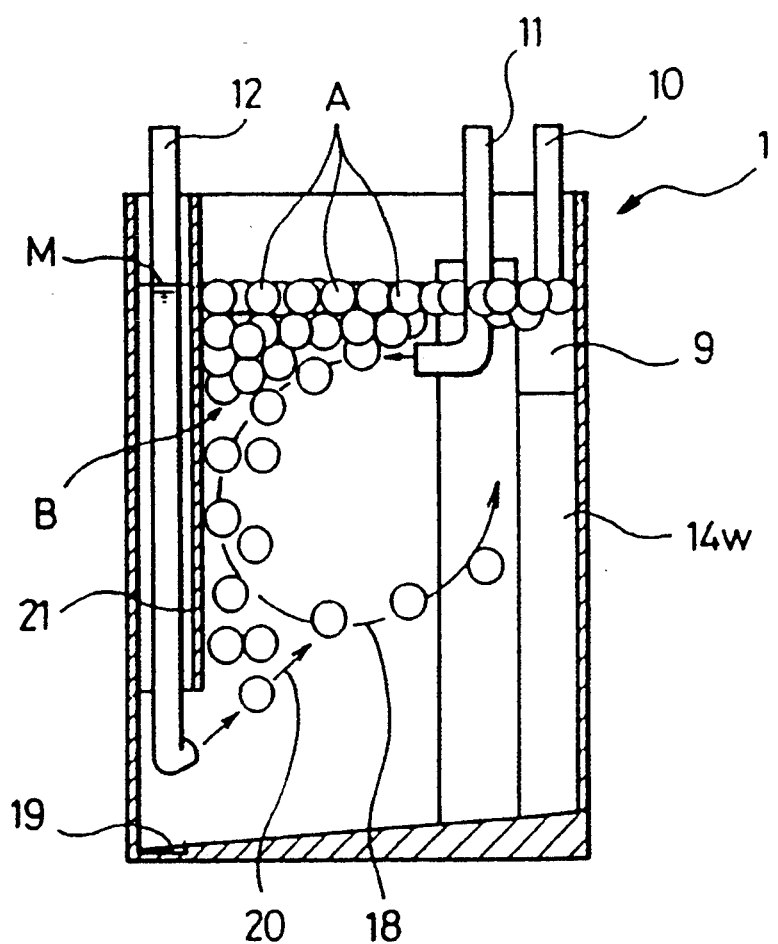
FIG. 3 is a schematic cross section of the apparatus taken along the line III—III of FIG. 2.
Figure 4:
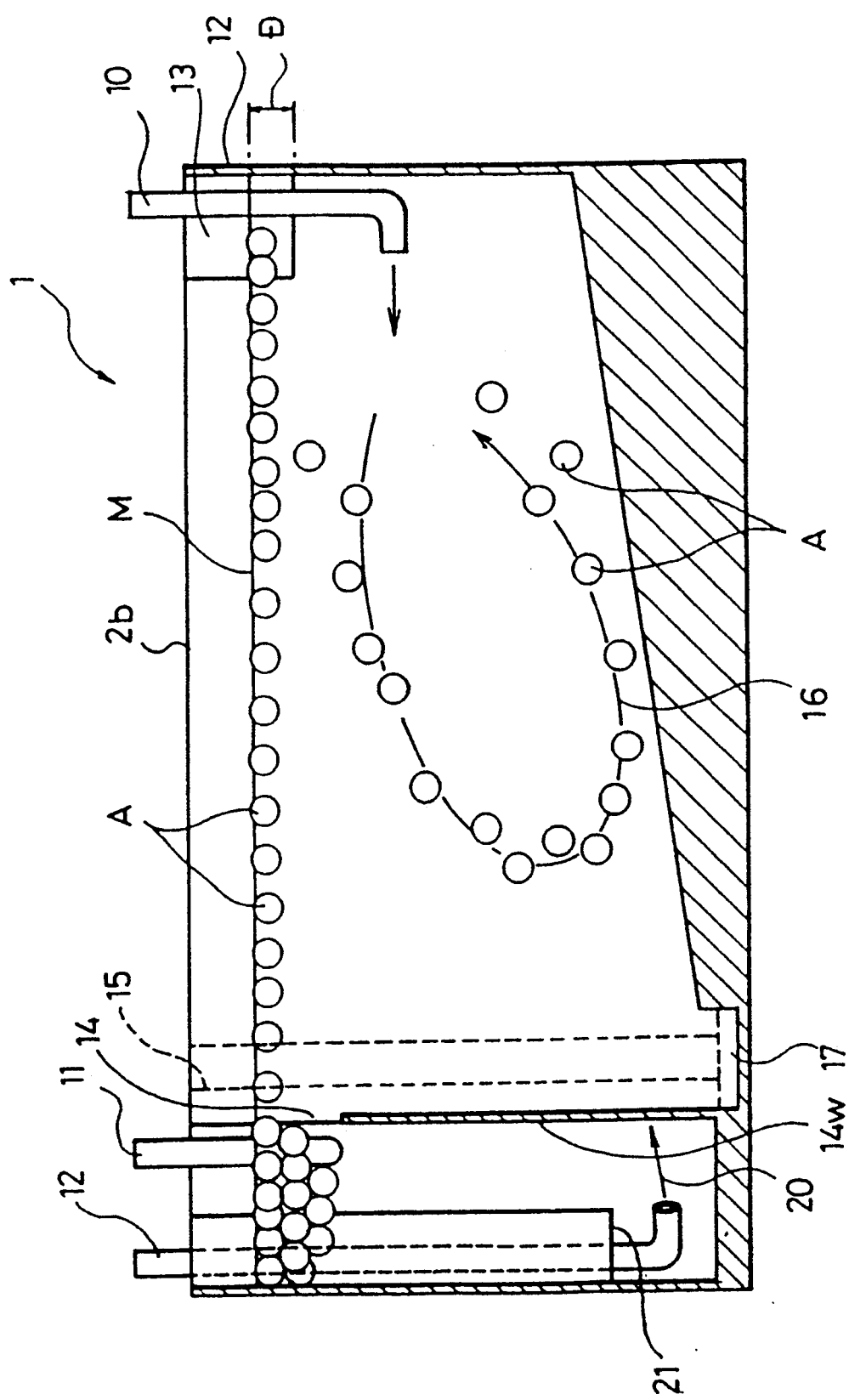
FIG. 4 is a schematic cross section of the apparatus taken along the line IV—IV of FIG. 2.
Figure 5:
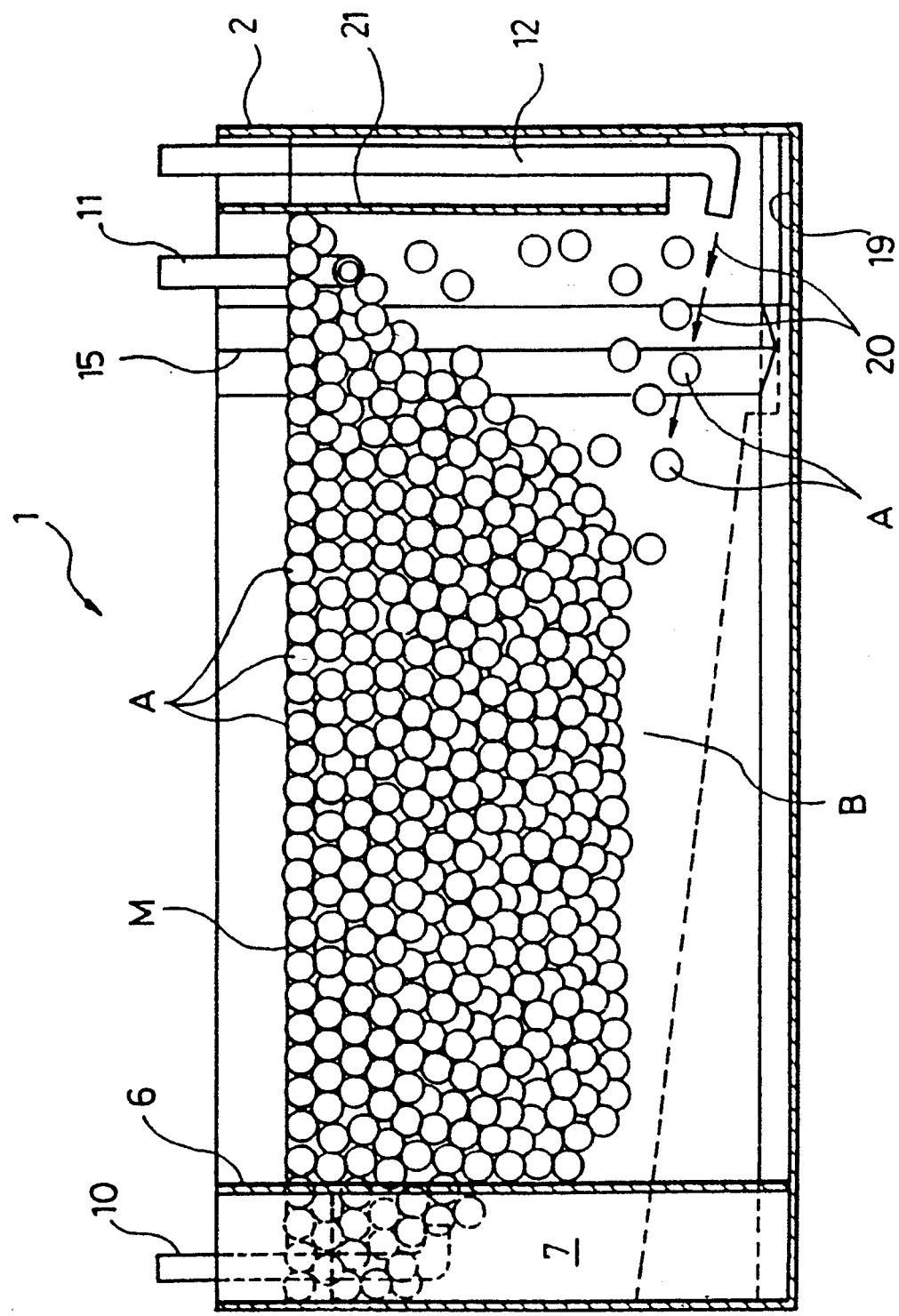
FIG. 5 is a schematic cross section of the apparatus taken along the line V—V of FIG. 2.

A circulating filter type sewage disposal apparatus 1 according to a first embodiment of the invention consists of a septic tank 2 containing filter media A, and a circulating means 3 for circulating the filter media A in the septic tank 2, as shown in FIG. 1.

As will be obvious from the later description, the filter media A in the septic tank 2 must be buoyant ones, for example, having a specific gravity of 0.95 to 0.98, which is slightly smaller than that of sewage, and an appropriate buoyancy such that they can float in the sewage, and also they must be hard to agglomerate one another. Meanwhile, the filter media A each have a spherical form with a diameter of about 10 cm, preferably 10 to 12 cm, and more preferably they each consist of a multiplicity of frames so as to obtain larger surface area. As the filter media A having such characteristics, the spherical filter medium disclosed in Japanese Patent No. 1343032 (Japanese Patent Publication (Kokoku) No. 61-2440) which has already been incorporated herein as reference is the most preferred.

Such filter media A, charged in the septic tank 2, pack intimately along the water surface M and downward to form an assembly of the filter media A, i.e. filter bed B. The sewage is purified by the action of the aerobic bacteria proliferating on the filter bed B. The filter media A are preferably charged to the septic tank 2 in an amount of 55 to 60% of the sewage accepting volume thereof.

The septic tank 2 is of an elongated rectangular shape, for example, having a length of 60 m and a width of 30 m. An upstream side wall 2a has a sewage inflow port 5 at the upper portion thereof, and a purified water discharge pit 7 is defined at one corner by a partition 6 on the downstream side. The sewage flowed through the sewage inflow port 5 is treated by the filter bed B as it flows gently downstream in contact with the filter bed B to be finally purified before it reaches the downstream extremity, and the purified water flows through a multiplicity of through holes 8 formed on the partition 6 into the purified water discharge pit 7 and is discharged therefrom by pumping up. It should be noted that the partition 6 defining the purified water discharge pit 7 also plays a role of eliminating dead area in the "movement" (to be described later) of the filter media A or filter bed B.

The filter circulating means 3 is intended for circulating the filter media A by repeating continuously the operation of returning the filter media A separated from the filter bed B at the downstream extremity of the septic tank 2 to the filter bed B at the upstream extremity, whereby to allow the filter bed B as a whole to flow calmly downstream as if it were a glacier. The clogging of the filter media A can effectively be prevented by the flow of the filter bed B. In order to provide such flow of the filter bed B, the filter circulating means 3 consists of a circulation passage 9, a filter moving current forming means 10, a first current forming means 11 and a second current forming means 12.

The circulation passage 9 is a means for moving the filter media A from the downstream side to the upstream side, which has a width W slightly larger than the diameter of the filter medium A and a depth substantially equal to that of the septic tank 2, and is provided along one longitudinal side of the septic tank 2, with one end portion thereof communicating through an inlet 13 to the downstream extremity of the tank 2, while the other communicating through an outlet 14 to the upstream extremity of the septic tank 2. The inlet 13 is defined by cutting off a part of the upper portion of the side wall 2b and has a depth D (measured from the water level) of 2 to 3 times the diameter of the filter medium A. Namely, such depth of the inlet 13 in combination with the width of the circulation passage 9 can introduce one to several filter media A at one time from the upper layer of the filter bed B to the circulation passage 9. Meanwhile, the outlet 14 is defined at the downstream end portion of the circulation passage 9 to communicate to the inside of the septic tank 2, in the minimum size necessary for allowing the filter media A to return into the septic tank 2. More specifically, the outlet 14 is defined at the upper part of a partition member 14w provided at the downstream end portion of the circulation passage 9, and has a height of about 2 to 3 times the diameter of the filter medium A. The outlet 14 has a triangular prismatic guide plate 15 disposed adjacent thereto so as to eliminate the dead area in the "movement" of the filter media A or filter bed B.

The filter moving current forming means 10 is intended for forming a current, in the circulation passage 9, which flows from the downstream extremity to the upstream extremity of the septic tank 2, and such current can be formed by jetting out the treated water in the purified water discharge pit 6 into the circulation passage 9 using a pump (not shown). The filter media A introduced from the inlet 13 are adapted to flow on this current formed by the filter moving current forming means 10 and moved from the downstream extremity to the upstream extremity of the septic tank 2. Incidentally, while the filter media A are spontaneously introduced to the circulation passage 9 due to the influence of the current exerted around the inlet 13 communicating to the septic tank 2, bridging of filter media A may occur around the inlet 13 depending on the conditions. Accordingly, it is preferred to provide a suitable means such as an impeller, which rotates slowly, at the inlet 13 to feed forcedly the filter media A into the circulation passage 9.

The jetting power and the position of the nozzle 10n of the filter moving current forming means 10 are set to predetermined levels, respectively, so that it can form a vortex current 16 parallel to the length and depth of the circulation passage 9. The vortex current 16 serves as a means for removing sludge from the filter media A. Namely, the filter media A moving along the circulation passage 9 on the current are also involved in the vortex current 16 and rotated, whereby the sludge deposited on the filter media A can be removed to clean the filter media A. The sludge flakes released from the filter media A creep along the slanted bottom of the circulation passage 9, accumulates in a pit 17 and is recovered by a pump (not shown).

Use of such water current system circulation passage 9 as the filter moving means facilitates separation of the filter media A from the filter bed B more effectively and efficiently and also reduces possible causes of troubles in the filter moving means. However, the filter moving means is not limited to the water current system, and, for example, a conveyor having a drive source, as necessary, equipped with a suitable sludge removing means thereon may be used. If the current system is employed, the intended object can fully be attained by providing a circulation passage having a depth so as to allow movement of the filter media A in one row therethrough. As such circulation passage, a ready-made concrete pipe may be disposed in the septic tank.

If a sludge removing means is provided in the circulation passage 9, the treated water is prevented from being affected by the sludge coming off from the filter media, and thus purification efficiency can further be enhanced. Further, the use of the vortex current 16 can provide a very simple and efficient sludge removing means. It is not always necessary indeed to provide such sludge removing means, since clogging of the filter media A can fully be prevented basically with the aid of the flow of the filter bed B, as described above, and if necessary other suitable means than the vortex current 16 can also be employed.

The first current forming means 11 is a part of the means for returning the filter media A moving along the circulation passage 9 to the filter bed B and is disposed at the upstream extremity of the septic tank 2, more specifically adjacent to the outlet 14 of the circulation passage 9.

The first current forming means 11, like the filter moving current forming means 10, jets out the treated water introduced from the purified water discharge pit 6 at a position rather closer to the water level M and forms a vortex current 18 orthogonal to the length of the septic tank 2 and parallel to the depth thereof. The filter media A fed out of the outlet 14 of the circulation passage 9 are involved in this vortex current 18 and rotate, and thus they are ready to be returned to the filter bed B. Simultaneously, this rotational movement of the filter media A involved in this current 18 allows cleaning of the filter media A, as it happens in the circulation passage 9, whereby clogging of the filter media A can be prevented effectively. The sludge flakes released from the filter media A creep along the slanted bottom of the septic tank 2, as it happens in the case of circulation passage 9, accumulate in a sludge pit 19 and are recovered by a pump (not shown).

The second current forming means 12 is intended for returning the rotating filter media A involved in the vortex current 18 formed by the first current forming means 11 to the filter bed B, and is disposed to oppose diagonally to the first current forming means 11 at the corner space defined by a guide plate 21 for eliminating the dead area, like in the case of guide plate 15. The second current forming means 12 forms a straight jet stream current 20 toward the downstream side of the septic tank 2 from a corner at the upstream extremity thereof. The filter media A involved in the vortex current 18 are driven out therefrom by the straight jet stream current 20 and returned to the bottom layer of the filter bed B.

Incidentally, the septic tank has at the bottom thereof a grate for preventing the filter media A from sinking to the bottom when the septic tank 2 is emptied and an aeration pipe for feeding air. Since these members are of well known structures, description thereof will be omitted. For easier understanding, the ratios of the size of the septic tank 2 to the filter media A and to other members are conveniently modified in the drawings.

Second Embodiment

Figure 6:
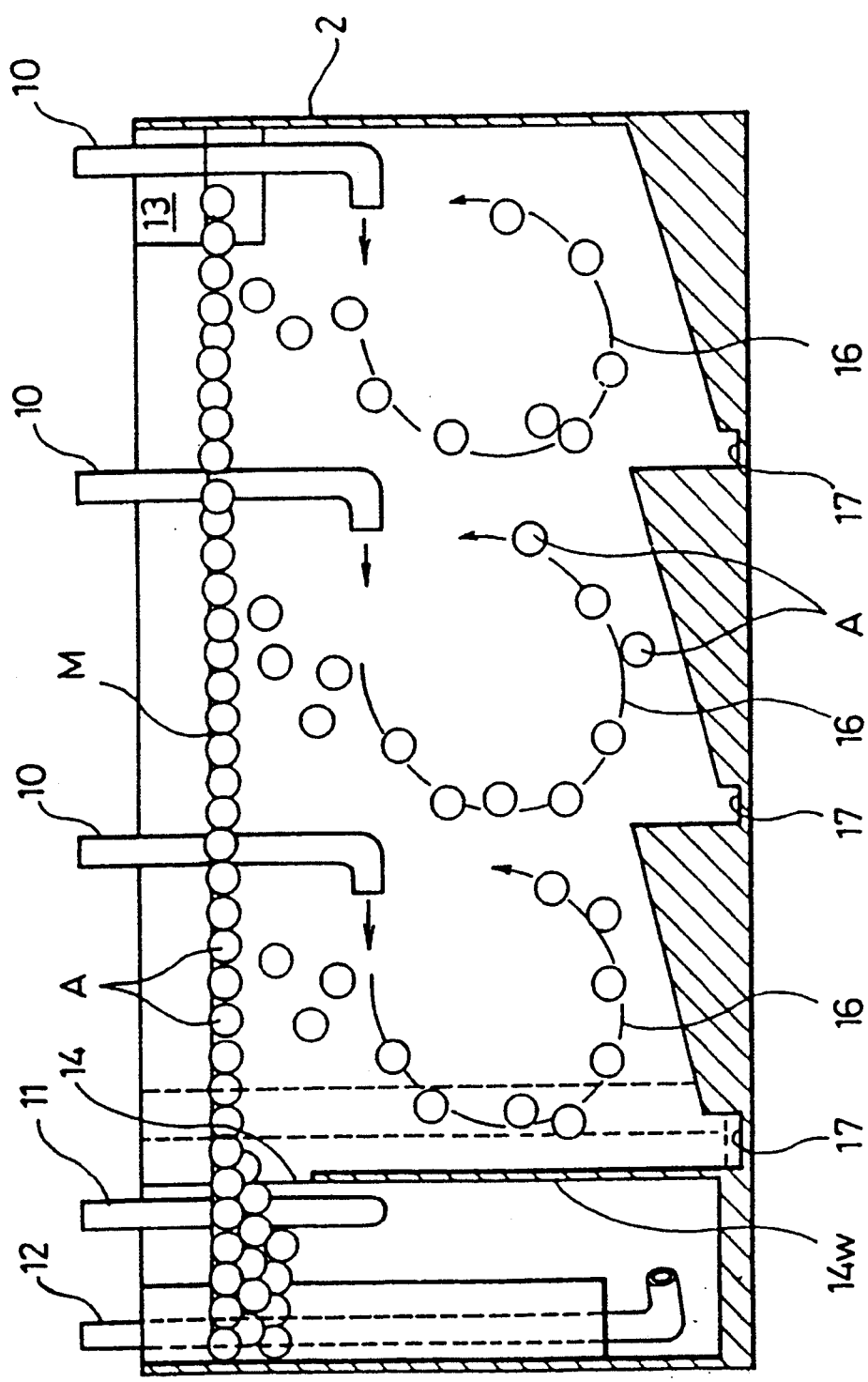
FIG. 6 shows schematically of the circulating filter type sewage disposal apparatus according to a second embodiment of the invention in the cross section corresponding to that of FIG. 4.

In the second embodiment, a plurality of sludge removing means which form vortex currents 16 are provided in the circulation passage 9, as shown in FIG. 6. This embodiment is suitably employed in the case of an elongated septic tank.

Third Embodiment

Figure 7:
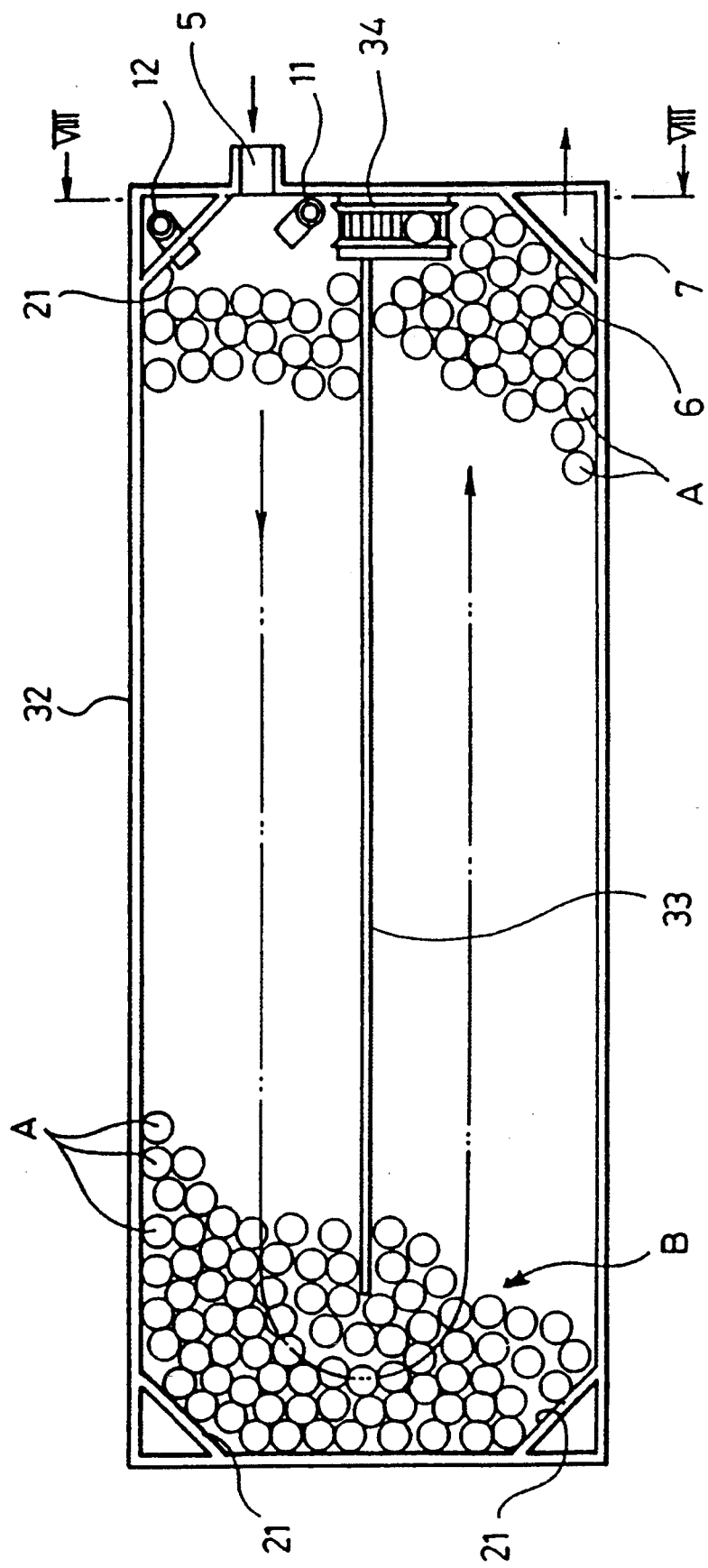
FIG. 7 is a schematic plan view of the circulating filter type sewage disposal apparatus according to a third embodiment of the invention.
Figure 8:
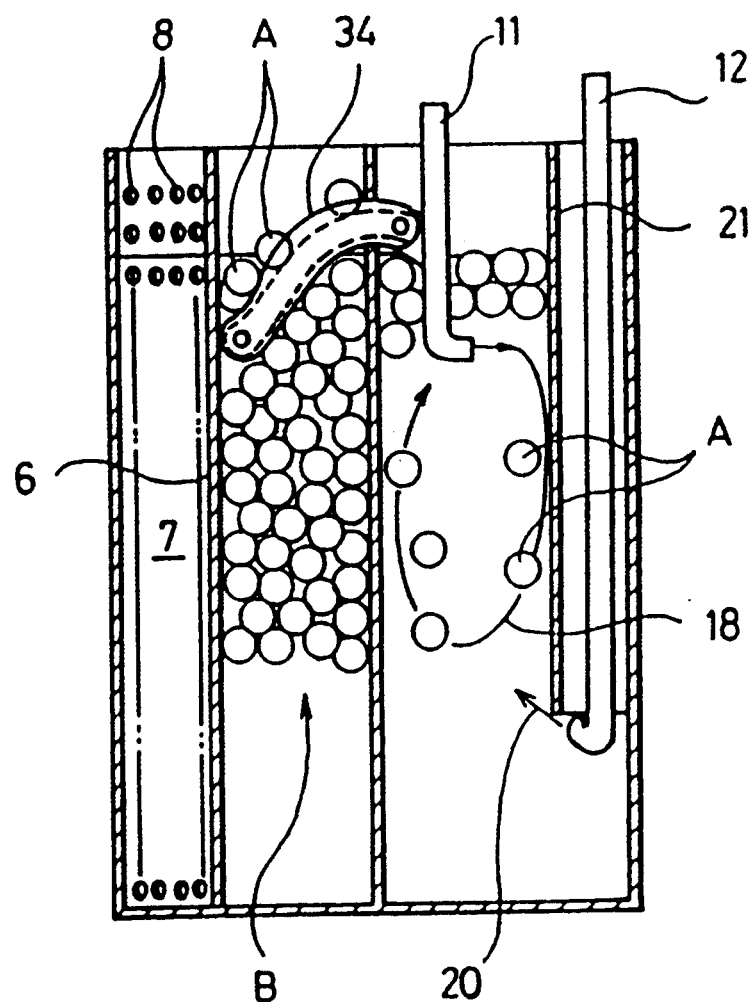
FIG. 8 is a schematic cross section taken along the line VIII—VIII of FIG. 7.

In the third embodiment, the septic tank 32 is of a shuttle type structure, as shown in FIGS. 7 and 8. More specifically, a partition 33 is disposed along the center line of the septic tank 32 to define a U-shaped passage, in which the upstream extremity and the downstream extremity are located side by side. This structure is suitably employed in the case of an elongated septic tank and allows effective utilization of the installation space.

In such shuttle type septic tank, a conveyor 34 may be disposed as the filter moving means across the adjacent upstream extremity and downstream extremity. The same effect as in the first embodiment can be obtained by transferring the filter media A reached the lower extremity to the upstream extremity as carried on the conveyor 34 and returning the thus transferred filter media A to the bottom layer of the filter bed B using the same first current forming means 11 and the second current forming means 12 as in the first embodiment.

CAPABILITY OF EXPLOITATION IN INDUSTRY

In the circulating filter type sewage disposal apparatus according to the present invention, the filter media are circulated by a circulation means to provide a gentle flow of filter bed, so that clogging of the filter media can be prevented effectively. Since the sludge deposited on the filter media are adapted to be removed by utilizing the circulatory movement of the filter media, prevention of filter medium clogging can be achieved more effectively. Besides, such prevention of filter medium clogging is carried out without affecting the sewage under purification treatment, contributing greatly to the improvement of purification efficiency of filter system sewage disposal treatment.

What is claimed is:

1. A circulating filter type sewage treatment apparatus, comprising:
   a septic tank having an upstream extremity, a downstream extremity and a multiplicity of buoyant filter media accommodated therein to form a filter bed in which sewage flows downstream;
   a filter moving means for returning the filter media to the upstream extremity from the downstream extremity of the septic tank; and
   a first current forming means at the upstream extremity of the septic tank for generating a vortex current and a second current forming means at the upstream extremity of the septic tank for generating a straight jet stream current;
   wherein filter media separated from the filter bed at the downstream extremity of the septic tank are brought back to the upstream extremity of the septic tank by the filter moving means, while filter media brought back to the upstream extremity are returned to the bottom layer of the filter bed by the vortex current from the first current forming means and the straight jet stream current from the second current forming means.

2. The circulating filter type sewage treatment apparatus according to claim 1, wherein said filter moving means is a current flowing from a downstream side to an upstream side of the septic tank, formed in a circulation passage defined in the septic tank which communicates at one end portion to the downstream extremity of the septic tank at the other end portion to the upstream extremity thereof.

3. The circulating filter type sewage treatment apparatus according to claim 2, wherein said circulation passage has provided therein a sludge removing means for removing sludge from the filter media.

4. The circulating filter type sewage treatment apparatus according to claim 3, wherein said sludge removing means is a vortex current formed in the circulation passage.

5. The circulating filter type sewage treatment apparatus according to claim 3, wherein said sludge removing means is a series of vortex currents disposed along a length of said circulation passage.

6. The circulating filter type sewage treatment apparatus according to claim 1, wherein said septic tank is of a shuttle type structure where the upstream extremity and the downstream extremity are located side by side.

7. The circulating filter type sewage treatment apparatus according to claim 6, wherein said filter moving means is a conveyor having a drive source.

8. The circulating filter type sewage treatment apparatus according to claim 7, wherein said first current forming means for generating a vortex current comprises a first water jet adjacent an outlet of said conveyor, and said second current forming means for generating a straight jet stream current comprises a second water jet disposed at a lower level than said first water jet.

9. The circulating filter type sewage treatment apparatus according to claim 1, wherein said filter moving means is a conveyor having a drive source.

10. The circulating filter type sewage treatment apparatus according to claim 1, wherein said first current forming means for generating a vortex current comprises a first water jet disposed adjacent an upstream end of said circulation passage, said first water jet having an outlet directed generally perpendicular to a downstream direction of the septic tank.

11. The circulating filter type sewage treatment apparatus according to claim 10, wherein said second current forming means for generating a straight jet stream current comprises a second water jet disposed adjacent an opposite side of the septic tank with respect to said first water jet, said first water jet having an outlet directed generally in a downstream direction.

12. The circulating filter type sewage treatment apparatus according to claim 11, wherein the outlet of said first water jet is at a higher level than the outlet of said second water jet.

13. The circulating filter type sewage treatment apparatus according to claim 12, wherein a partition member is provided at said upstream end of said circulation passage, said partition member blocking a lower portion of the circulation passage to direct filter media to the first water jet and to prevent sludge from recirculating back through the septic tank.

14. The circulating filter type sewage treatment apparatus according to claim 13, wherein a bottom surface of said circulation passage is sloped in a direction of a first sludge accumulating pit adjacent said partition member.

15. The circulating filter type sewage treatment apparatus according to claim 14, wherein a bottom surface of the septic tank adjacent said upstream extremity is sloped in the direction of a second sludge accumulating pit adjacent said second water jet.

* * * * *